Aug. 5, 1958     J. A. AXELSON     2,846,165
AIRCRAFT CONTROL SYSTEM
Filed June 25, 1956     2 Sheets—Sheet 1
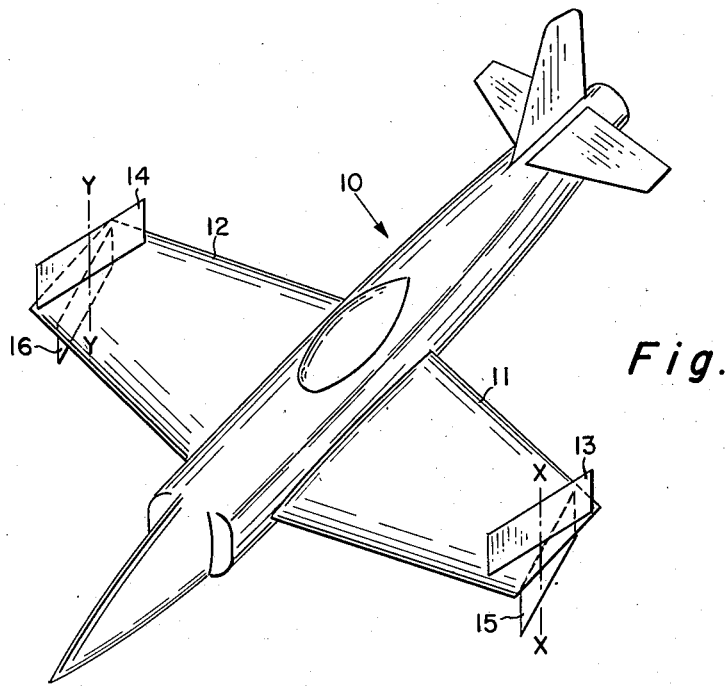
Fig. 1
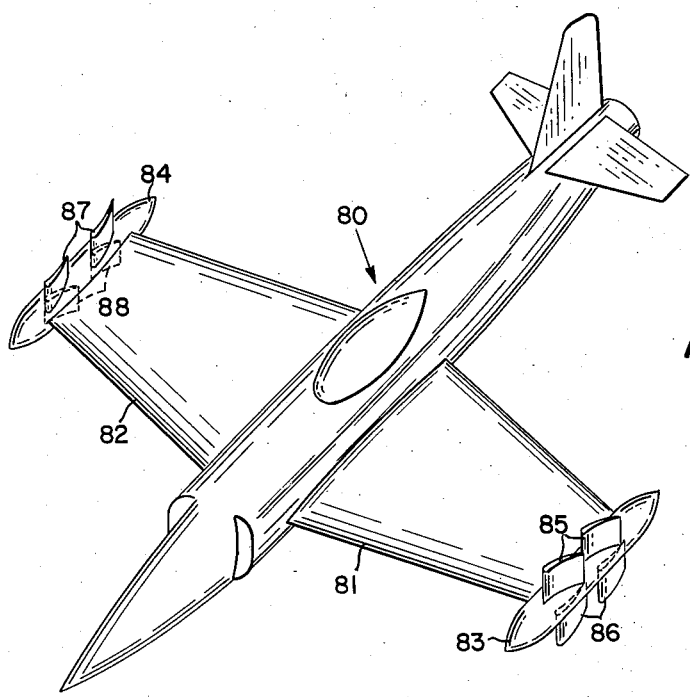
Fig. 3
INVENTOR.
JOHN A. AXELSON
BY
ATTORNEYS Aug. 5, 1958

J. A. AXELSON 2,846,165

AIRCRAFT CONTROL SYSTEM

Filed June 25, 1956

INVENTOR.
JOHN A. AXELSON

BY

ATTORNEYS

United States Patent Office
2,846,165
Patented Aug. 5, 1958

2,846,165

AIRCRAFT CONTROL SYSTEM

John A. Axelson, Los Altos, Calif.

Application June 25, 1956, Serial No. 593,778

5 Claims. (Cl. 244—90)

(Granted under Title 35, U. S. Code (1952), sec. 266)

The invention described herein may be manufactured and used by or for the Government of the United States of America for governmental purposes without the payment of any royalties thereon or therefor.

The present invention relates to a new and novel aircraft control system and more particularly to an aircraft control system employing one or more auxiliary airfoils mounted adjacent the wing-tips of the aircraft for controlling the lift on the wings.

Conventional aileron controls have been employed successfully for many years for controlling the lateral attitude of aircraft and the lift on the wings thereof. Such controls give relatively good results at subsonic speeds and present no serious problem at such speeds. However, with the advent of modern jet aircraft traveling at transonic and supersonic speeds the problem of controlling the aircraft and the lift on the wings has become critical; and conventional trailing edge ailerons have proven to be inadequate for successfully controlling the aircraft at these speeds. Conventional ailerons have proved unsuccessful due to their reduced and often reversed effectiveness at transonic and supersonic speeds and to the excessive hinge moments thereon which present serious structural problems in providing constructions of sufficient strength and also in providing adequate means for operating the control surfaces.

The present invention provides an arrangement wherein one or more auxiliary airfoils are provided either on the upper, lower, or both surfaces of the main wing adjacent the tips thereof. The control axes of each of the auxiliary airfoils are substantially parallel to the yaw axis of the aircraft and are disposed forwardly of the trailing edges of the wings. At subsonic speeds, deflection of the controls produces aerodynamic loads on the auxiliary airfoils which induce similar incremental loads on the adjacent surfaces of the wing. These induced loading increments add to the loading on one half of the wing and subtract from the loading on the other half of the wing when roll control is desired. The induced loads outboard on each half of the wing having large lever arms produce effective rolling moments for lateral control of the aircraft.

At transonic speeds, the auxiliary airfoils achieve maximum effectiveness and are superior to conventional ailerons which have greatly reduced or even reversed effectiveness. The auxiliary airfoils extend normal to the surface of the wing and operate in undisturbed air, while conventional ailerons operate in the boundary layer and wake of the wing and are subject to the deterioration in performance by shock-wave boundary-layer interaction and air flow separation. In addition, loads are induced over most of the wing by the auxiliary airfoils, while the load on the conventional aileron is confined near the trailing edge of the wing where it produces a twisting of the wing causing an oppositely directed load to be developed on the wing which opposes the rolling effort of the conventional aileron.

Deflection of the auxiliary airfoils at supersonic speeds provides independent control of the lift on each half of the wing by creating regions of compression from shock waves or regions of rarefactions from expansions across the adjacent surfaces of the wings. The differences in pressure created by deflection of the airfoils provide lift control when the controls are deflected in a similar manner at opposite wing-tips or it may provide roll control when actuated differentially at the opposite wing tips.

In an arrangement according to the present invention, the loads produced by deflecting the controls are distributed over a large portion of the wing surface at supersonic speeds rather than aft of the hinge line as in conventional ailerons, thereby greatly alleviating the structural problems in connection with the construction of the wing. The large hinge moments occurring with conventional ailerons are substantially reduced, and the provision of aerodynamic balances which are necessary with conventional ailerons thereby causing an attendant loss in effectiveness are eliminated in the present arrangement. Furthermore, at supersonic speeds lift of the aircraft may be varied without changing the angle of attack of the aircraft, thereby providing more rapid response, reducing the drag of the aircraft, and simplifying the guidance control thereof. For even greater changes in lift, both the deflection of the auxiliary airfoils and the angle of attack of the aircraft may be changed simultaneously.

The primary object of the present invention is the provision of a lateral aircraft control which retains its effectiveness through subsonic, transonic and supersonic speeds.

Another object of the present invention is the provision of a new and novel aircraft control system which reduces the hinge moments to a minimum on the control surfaces utilized in supersonic aircraft.

Another object is to provide an aircraft control system which eliminates the necessity of providing aerodynamic balances on the control surfaces.

A further object of the invention is the provision of means for varying the lift on the wings of an aircraft without necessarily changing the angle of attack thereof.

Yet another object is to provide an aircraft control system which is simple and inexpensive in construction, yet sturdy and reliable in operation.

Other objects and many of the attendant advantages of this invention will be readily appreciated as the same becomes better understood by reference to the following detailed description when considered in connection with the accompanying drawings wherein:

Fig. 1 is a perspective view of an aircraft employing a single auxiliary airfoil adjacent each of the wing tips thereof;

Fig. 3 is a perspective view of an aircraft employing a plurality of auxiliary airfoils disposed adjacent each of the wing tips thereof.

Figure 2:
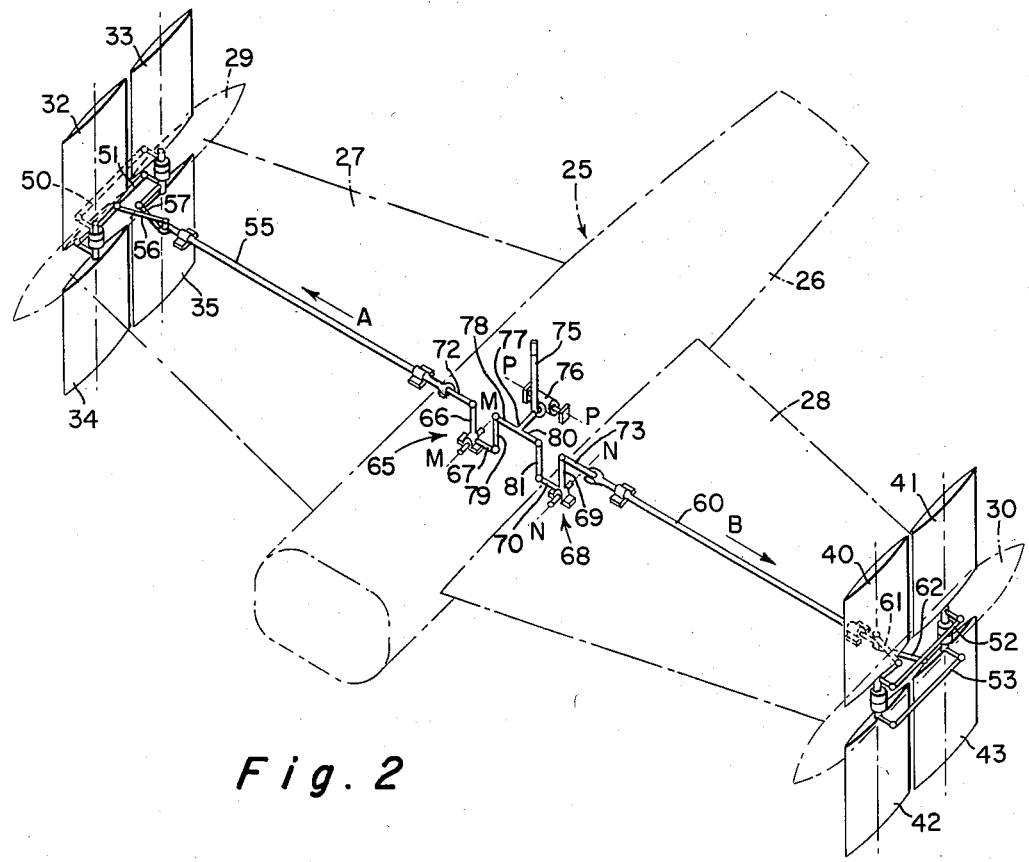
Fig. 2 is a somewhat schematic perspective view of a control system for operating a plurality of auxiliary airfoils mounted adjacent each wing tip of an aircraft.

Referring now to the drawings wherein like reference characters designate similar parts throughout the several views, there is shown in Fig. 1 an aircraft indicated generally by reference numeral 10 having wings 11 and 12 extending laterally from the opposite sides thereof. It should be noted that since the present invention is particularly suited for use in supersonic applications, the aircraft has been shown as a modern high-speed jet type aircraft having thin wings of small aspect ratio.

Mounted adjacent each tip of wings 11 and 12 are upper auxiliary airfoils 13 and 14 respectively and lower auxiliary airfoils 15 and 16 respectively. Airfoils 13 and 15 are mounted for pivotal movement about an axis X—X and air foils 14 and 16 are mounted for pivotal movement about an axis Y—Y. It should be noted that the longitudinal dimensions of the auxiliary airfoils are substantially the same as the chords of the wings at the wing-tips whereby the auxiliary airfoils have a variable end plate effect on the wing tip vortexes at subsonic speeds, but are designed to achieve completely different and unique effects at transonic and supersonic speeds.

Suitable control means (not shown) are provided for actuating the auxiliary airfoils in such a manner that each pair of airfoils 13, 15 and 14, 16 are actuated in opposite directions. In other words, when airfoil 13 is rotated in a clockwise direction about axis X—X, airfoil 15 will be rotated in a counterclockwise direction about the axis. Conversely, if airfoil 13 is rotated in a counterclockwise direction, airfoil 15 will be actuated in a clockwise direction. Airfoils 14 and 16 are actuated in a similar manner. The control system is so arranged that each pair of airfoils 13, 15 and 14, 16 may be actuated either similarly or oppositely, but the airfoils of each pair are always rotated simultaneously and in opposite directions.

Axes X—X and Y—Y are the control axes of the airfoils shown in Fig. 1 and as used herein, the term "control axis" is intended to denote the axis about which the auxiliary airfoils are moved or controlled. According to this definition, the control axis is one which passes through the auxiliary airfoil in the plane thereof and may be either a pivotal axis or an axis of translation. It is obvious that the control axes X—X and Y—Y are pivotal axes and are positioned forwardly of the trailing edge of the wing which is an important feature of the invention, enabling the desired result to be obtained.

In accordance with the foregoing described arrangement, areas of increased pressures or areas of rarefaction may be produced on the surfaces of the wings of the aircraft. It is evident that when the auxiliary airfoils are so aligned as to be substantially symmetrical about the roll axis of the aircraft, there will be substantially no net rolling moment acting on the aircraft. However, upon actuation of airfoils 14 and 16 into the position shown, two important results are obtained. The upper auxiliary airfoil 14 the forward end of which has been pivoted outwardly deflects the oncoming airstream in such a manner that shock waves are produced and an increased pressure area is created on the upper surface of wing 12 between airfoil 14 and the fuselage of the aircraft. Simultaneously with this action, airfoil 16 the forward end of which has been pivoted inwardly deflects the oncoming air in such a manner that a rarefaction or area of reduced pressure is created adjacent the lower surface of wing 12. It is apparent that these two combined effects of providing an increased pressure on the upper surface of wing 12 and a reduced pressure on the lower surface thereof reduces the lift on the wing tending to cause the wing to drop, thereby producing the same result as obtained by deflecting a conventional aileron in an upward direction.

It is accordingly evident that by deflecting the leading edge of the auxiliary airfoils inwardly, the pressure may be reduced on the adjacent wing surface and that by pivoting the leading edge of the auxiliary airfoils in an outward direction, the pressure may be increased on the adjacent wing surface. It may be seen therefore that airfoil 13 produces an area of decreased pressure adjacent the upper surface of wing 11 and airfoil 15 creates an area of increased pressure on the lower surface of wing 11 thereby increasing the lift on wing 11. Since the lift on wing 11 is increased and the lift on wing 12 is decreased by the arrangement of airfoil shown in Fig. 1, it is apparent that the airfoils are in a position for providing a right hand roll of the aircraft. By pivoting the leading edges of both upper airfoils 13 and 14 inwardly into the position of airfoil 13, the lift on the aircraft may be increased without changing the angle of attack of the aircraft; and by pivoting both upper airfoils 13 and 14 outwardly into the position of airfoil 14, the lift on the wings may be reduced without altering the angle of attack. To facilitate transfer of the pressure field from each auxiliary or control airfoil to the surface of its associated wing, it is essential that a minimum gap be maintained between such airfoil and the wing surface. Consequently, the airfoil is mounted in as close proximity as possible to the wing.

Airfoils 13—16 have been shown rather schematically but it is apparent that they may be given a suitable aerodynamic shape and cross sectional configuration in accordance with well-known practice.

The auxiliary airfoils are pivotally mounted closely adjacent the wing tips of wings 11 and 12, but are preferably mounted sufficiently inboard such that when in operative position as shown in Fig. 1, the leading and trailing edges of the auxiliary airfoils do not extend laterally outward of the outer edge of the wing tip.

Referring now to Fig. 2, there is shown an aircraft indicated by phantom line 25 and comprising a fuselage 26 having wings 27 and 28 extending laterally therefrom in opposite directions. Although the auxiliary airfoils may be mounted directly within the wing structure, the aircraft shown in Fig. 2 is provided with additional streamlined body members 29 and 30 mounted at the outer ends of wings 27 and 28. Suitably mounted for rotation within body member 29 are two upper auxiliary airfoils 32, 33 and two lower auxiliary airfoils 34, 35. Suitably mounted for rotation within body member 30 are two upper auxiliary airfoils 40, 41 and two lower auxiliary airfoils 42, 43. It should be noted that each of the pairs of auxiliary airfoils 32 and 34, 33 and 35, 40 and 42, 41 and 43, are supported for pivotal movement about common control axes each of which is substantially parallel to the yaw axis of the aircraft and which are each disposed forwardly of the trailing edge of the associated wing. The provision of a plurality of airfoils in contrast to the single control airfoil employed in the device shown in Fig. 1 results in certain advantages when the aircraft is operated in the supersonic speed range since the center of pressure travel of the wing is reduced and the hinge moments on the control surfaces are greatly reduced. Two upper and two lower auxiliary airfoils are positioned adjacent each wing-tip in this modification, but it is apparent that any number of airfoils greater than two may be utilized if desired.

Although numerous conventional control systems may be utilized in conjunction with the present invention, a typical control system is illustrated in Fig. 2. Upper airfoils 32 and 33 are connected for simultaneous rotation by a conventional link 50 and lower airfoils 34 and 35 are also connected for simultaneous rotation by a conventional link 51. Upper airfoils 40 and 41 are connected for simultaneous rotation by a conventional link 52 and lower airfoils 42 and 43 are connected for simultaneous rotation by a conventional link 53. A control rod 55 is pivotally connected to upper airfoils 32, 33 by a conventional link 56 and is pivotally connected to lower airfoils 34 and 35 by a conventional link 57. It is therefore evident that upon movement of control rod 55, the upper and lower airfoils are pivoted in opposite directions. For example, if control rod 55 is actuated in the direction of arrow "A" in Fig. 2, upper airfoils 32 and 33 are pivoted in a counterclockwise direction and lower airfoils 34 and 35 are pivoted in a clockwise direction, which as explained previously causes the lift on wing 27 to increase.

A control rod 60 is pivotally connected to upper airfoils 40 and 41 by a conventional link 61 and is pivotally connected to the lower airfoils 42 and 43 by a conventional link 62. In this manner, the upper and lower airfoils are actuated in opposite directions; and it is apparent that by actuating control rod 60 in the direction of arrow "B" in Fig. 2, airfoils 40 and 41 are rotated in a clockwise direction and airfoils 42 and 43 are rotated in a counterclockwise direction thereby increasing the lift on wing 28.

Toggle member 65 having arms 66 and 67 is pivotally mounted about an axis M—M, and toggle member 68 having arms 69 and 70 is pivotally mounted about axis N—N, the supporting structure for the two toggle members being suitably fixed to the aircraft. Control rod 55 is pivotally connected to arm 66 by a conventional link 72, and control rod 60 is pivotally connected to arm 69 by a conventional link 73. A conventional control stick 75 is pivotally supported by housing 76 which is pivotally secured about the axis P—P thereof to the aircraft. The lower end 77 of the control stick is T-shaped in configuration, one arm 78 thereof being connected by a conventional link 79 to arm 67 of toggle 65, and another arm 80 of the control stick being connected by a conventional link 81 to arm 70 of toggle 68.

It may be seen that if the pilot wishes to increase the lift of the aircraft, he merely pulls back on the control stick in a conventional manner whereby each of control rods 55 and 60 is actuated outward in the direction of arrows "A" and "B" respectively, pivoting the airfoils into lift position. In a converse manner, by pushing forward on the stick, control rods 55 and 60 are both actuated inwardly thereby reducing the lift on the wings. If the pilot wishes to roll in either direction, the control stick may be actuated in a conventional manner whereby the upper airfoils at each wing tip and the lower airfoils at each wing tip are operated differentially so as to cause the aircraft to roll in the desired direction.

Referring now to Fig. 3, there is shown an aircraft indicated generally by reference numeral 80 having wings 81 and 82 extending laterally therefrom in opposite directions and having streamlined body members 83 and 84 mounted at the outer end thereof respectively. A plurality of similar airfoils 85 extend upwardly from body member 83 and a plurality of similar airfoils 86 extend downwardly from body member 83. Each of airfoils 85 and 86 are slidably mounted within the body member 83 and are adapted to be translated along the control axes thereof by a suitable control means (not shown). The angle of the auxiliary airfoils with respect to the oncoming air stream is fixed for optimum control, and the airfoils may be slidably extended from the body member to vary the lift on the wing. A similar set of upper and lower airfoils 87 and 88 are mounted within body member 84, and it should be noted that the airfoils are in such position that when extended the pressure on the upper surfaces of the wings is reduced and the pressure on the lower surface of the wings is increased. Therefore, by extending the auxiliary airfoils, the lift on the aircraft is increased and by retracting the auxiliary airfoils, the lift is decreased. It is also apparent that by operating the airfoils in body members 83 and 84 differentially, the aircraft may be caused to roll in a conventional manner.

Figure 4:
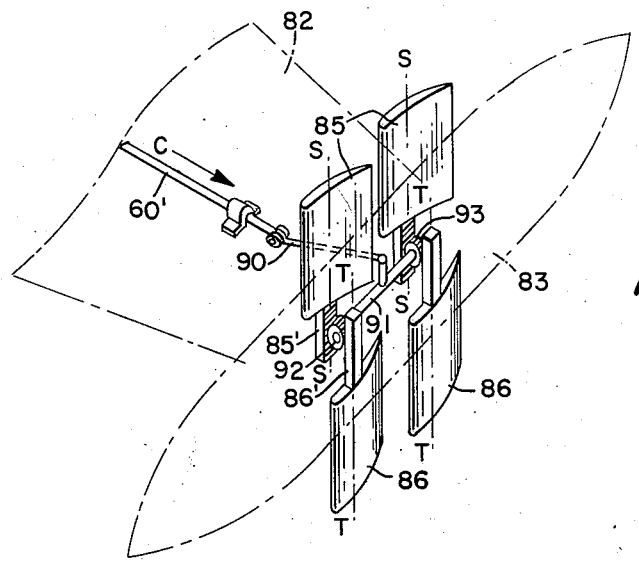
Fig. 4 is a partial schematic view of a modified control system employed in the embodiment shown in Fig. 3.

Referring now to Fig. 4, a control means is shown for extending and retracting the airfoils shown in Fig. 3. A control rod 60' corresponding to control rod 60 of Fig. 2 is shown, and the remainder of the control system which is not shown in Fig. 4 is identical with that shown in Fig. 2. The outer end of control rod 60' is connected by a conventional link 90 with a shaft 91 which is suitably rotatably journaled within member 83. Airfoils 85 and 86 are provided with rack portions 85' and 86' respectively which have teeth thereon adapted to engage suitable pinions 92 and 93 fixed to the outer end of shaft 91. It is apparent that by actuating rod 60', shaft 91 may be rotated in opposite directions thereby either extending or retracting auxiliary airfoils 85 and 86. By actuating rod 60' in an outer direction as indicated by arrow "C" in Fig. 4, the auxiliary airfoils are extended thereby increasing the lift on the wing; and conversely, by actuation of rod 60' in the opposite direction, the airfoils are retracted thereby reducing the lift on the wing.

The control axes S—S of upper auxiliary airfoils 85 extend longitudinally through the airfoils and the rack portions thereof and are parallel to similar control axes T—T of the lower airfoils 86. It should be noted that in this arrangement, the control axes are axes of translation in contrast to the pivotal axes of the airfoils disclosed in Figs. 1 and 2. However, the control axes of the airfoils shown in Figs. 3 and 4 are similarly disposed with respect to the aircraft structure, i. e., the control axes are substantially parallel to the yaw axis of the aircraft and are disposed forwardly of the trailing edge of the associated wing.

Although the auxiliary airfoils of the present invention are adapted to be mounted directly in the wing structure of an aircraft, it is apparent that they may also be mounted in additional streamlined bodies provided at the outer ends of the wings as shown, and consequently conventional aircraft may be modified by the provision of additional streamlined bodies at the wing-tips containing auxiliary airfoils according to the present invention in addition to the conventional ailerons employed therein.

When a plurality of airfoils are utilized, it may also be desirable to provide such airfoils with conventional shrouds or end plates in a well known manner. The plan form of the wing may also be modified to correspond with the areas of pressure induced by the auxiliary airfoils to provide improved wing performance.

It is apparent from the foregoing that there is provided a new and novel aircraft control system providing effective lateral control at all speeds, which reduces the hinge moments on control surfaces utilized in supersonic aircraft to a minimum, and which eliminates the necessity of providing aerodynamic balances on such surfaces. The invention also provides a means for varying the lift on the aircraft without varying the angle of attack thereof, and it is simple and inexpensive in construction, yet sturdy and reliable in operation.

Obviously many modifications and variations of the present invention are possible in the light of the above teachings. It is therefore to be understood that within the scope of the appended claims the invention may be practiced otherwise than as specifically described.

I claim:

1. An arrangement for providing lateral control of an aircraft of the monoplane type having a fuselage and a yaw axis about which it is adapted to yaw, wings extending laterally from both sides of said fuselage, each of said wings having a leading edge and a trailing edge disposed rearwardly of said leading edge, at least one auxiliary airfoil extending in a direction essentially normal to the surface of said wings and supported by and being positioned adjacent the tip of each of said wings, each of said auxiliary airfoils extending over the majority of the tip chords of said wings so as to develop a maximum pressure field and being mounted so as to maintain a minimum gap between it and the wing associated therewith and thus precludes any appreciable leakage of air through said gap, each of said airfoils having a control axis passing therethrough and being pivoted for rotation about such control axis, each of said control axes being substantially parallel to said yaw axis and being disposed forwardly of the trailing edge of the associated wing, and means for controlling the movement of said airfoils to selectively control the development of differential pressure fields and hence the amount of loading induced on said wings by transfer of such pressure fields thereto in a direction normal to the wing surface.

2. An arrangement for providing lateral control of an aircraft of the monoplane type having a fuselage and a yaw axis about which it is adapted to yaw, wings extending laterally from both sides of said fuselage, each of said wings having a leading edge and a trailing edge disposed rearwardly of said leading edge, two pairs of auxiliary airfoils pivotally supported by and being positioned adjacent the tip of each of said wings, the two auxiliary airfoils of each pair being mounted in tandem and collectively extending over the majority of the tip chords of said wings so as to develop a maximum pressure field for transfer to said wings in a direction essentially normal to the surface of the latter, each of said airfoils having a control axis passing therethrough and being pivotally movable about the control axis thereof, each of said auxiliary airfoils being mounted so as to maintain a minimum gap between such auxiliary airfoil and the wing associated therewith, one pair of said airfoils extending from each wing in an upward direction and one pair of said airfoils extending from each wing in a downward direction, each of said control axes being substantially parallel to said yaw axis and being disposed forwardly of the trailing edge of the associated wing, and control means for pivoting the upwardly extending air foils and the associated downwardly extending airfoils adjacent each wing tip in opposite directions upon actuation of said control means.

3. In combination, an aircraft having a fuselage and a yaw axis about which it is adapted to yaw, wings extending laterally from both sides of said fuselage, each of said wings having a leading edge and a trailing edge disposed rearwardly of said leading edge, a plurality of auxiliary airfoils slidably supported by and being positioned adjacent the tip of each of said wings, each of said airfoils having a control axis passing therethrough and being movable along the control axis thereof, some of said airfoils extending from said wings in an upward direction and some of said airfoils extending from said wings in a downward direction, each of said control axes being substantially parallel to said yaw axis and being disposed forwardly of the trailing edge of the associated wing, and control means for moving the upwardly extending airfoils and the associated downwardly extending airfoils adjacent each wing tip in opposite directions substantially parallel to said yaw axis upon actuation of said control means.

4. An arrangement for providing lateral control of an aircraft of the monoplane type having a fuselage and a yaw axis about which it is adapted to yaw, wings extending laterally from both sides of said fuselage, each of said wings having a leading edge and a trailing edge disposed rearwardly of said leading edge, a pair of auxiliary airfoils supported by and being positioned adjacent the tip of each of said wings, each of said auxiliary airfoils extending over the majority of the tip chords of said wings so as to develop a maximum pressure field for transfer to said wings in a direction essentially normal to the surface of the latter, one auxiliary airfoil extending above and one auxiliary airfoil extending below each of said wings adjacent the tips thereof, each of said airfoils having a control axis passing therethrough and being movable with respect to such control axis, each of said auxiliary airfoils being mounted so as to maintain a minimum gap between such auxiliary airfoil and said wing, each of said control axes being substantially parallel to said yaw axis and being disposed forwardly of the trailing edge of the associated wing, and means for controlling the movement of said airfoils.

5. The combination as defined in claim 4 wherein said control means is connected to said airfoils such that the upwardly extending airfoil and the associated downwardly extending airfoil adjacent each wing tip are moved in opposite directions upon actuation of said control means.

References Cited in the file of this patent
UNITED STATES PATENTS

| 1,059,480 | Marr | Apr. 22, 1913 |
| 1,334,707 | Martin | Mar. 23, 1920 |
| 1,756,300 | Pearson | Apr. 29, 1930 |